March 26, 1963     J. G. PAXTON     3,082,637
QUICK-CHANGE SPROCKET

Filed Oct. 17, 1961     2 Sheets-Sheet 1

INVENTOR.
Jack G. Paxton
BY
Webster & Webster
ATTYS.

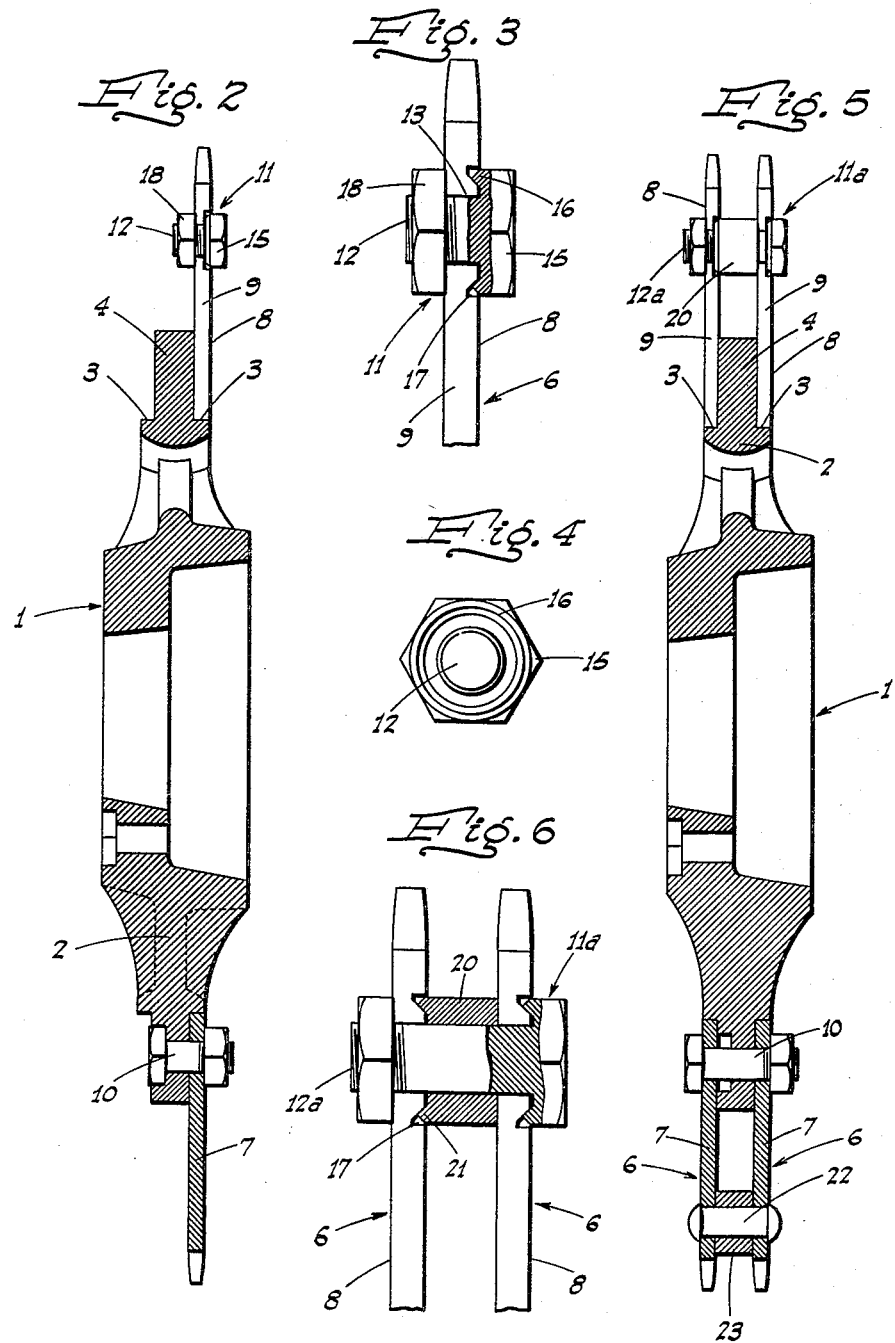

United States Patent Office 3,082,637
Patented Mar. 26, 1963

3,082,637
QUICK-CHANGE SPROCKET
Jack Gerald Paxton, Sanger, Calif., assignor to General Nailing Machine Corporation, Sanger, Calif., a corporation of California
Filed Oct. 17, 1961, Ser. No. 145,585
5 Claims. (Cl. 74—243)

This invention relates to sprockets or sprocket wheels, and particularly to one primarily designed for use on small motor-driven vehicles known as "Go-carts," and which are now being widely used for short track racing.

In these vehicles, a sprocket drive connects the engine shaft and the axle of the driven wheels, and it is sometimes desired to change the speed ratio of the drive, which can only be done by changing one or the other of the sprockets.

As such vehicles are presently constructed, this cannot be done without practically dismantling the drive shaft or axle, and the major object of the present invention therefore is to provide a sprocket wheel so constructed that toothed portions having different pitch diameters may be selectively mounted on the one fixed hub as may be desired, without any removal of the shaft or axle, or the bearing thereof, being necessary, and which enables any change to be quickly and easily effected.

The toothed portions of the wheel are initially separate from each other, and are relatively thin and somewhat flexible. Another object of the invention therefore is to provide readily detachable units which connect such portions together radially out from the rigid hub of the wheel in such a manner as to lock and clamp said portions together against separation and relative displacement of the same.

A further object of the invention is to construct the hub portion of the improved sprocket wheel so that either single or dual tooth portions may be mounted thereon, as may be desired.

An additional object of the invention is to provide a quick-change sprocket which is designed for ease and economy of manufacture.

Still another object of the invention is to provide a practical, reliable, and durable quick-change sprocket, and one which will be exceedingly effective for the purpose for which it is designed.

These objects are accomplished by means of such structure and relative arrangement of parts as will fully appear by a perusal of the following specification and claims.

In the drawings:

FIG. 2 is a diametral section on line 2—2 of FIG. 1.

FIG. 3 is a fragmentary enlarged radial section of the tooth portion of the wheel, taken at the split radial edge thereof, and showing the adjacent locking and alining bolt unit associated therewith, partly broken out and in section.

FIG. 4 is a detached end view of the bolt of such unit.

FIG. 5 is a sectional view of the sprocket wheel similar to FIG. 2, but showing dual tooth portions mounted on the hub.

FIG. 6 is a fragmentary enlarged view similar to FIG. 3, but showing one of the special locking and alining units for the dual tooth portions of the wheel of FIG. 5.

Figure 1:
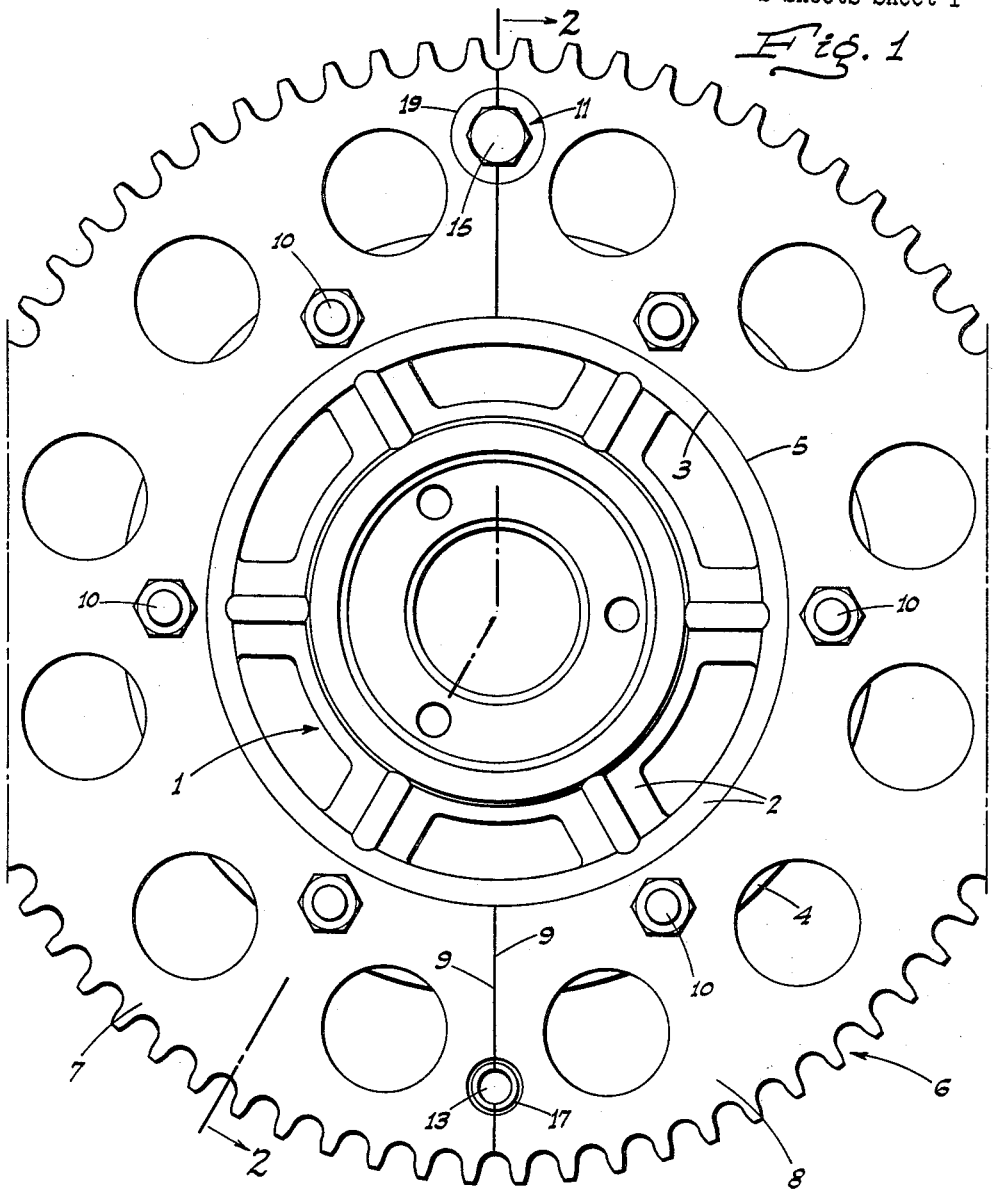
FIG. 1 is a side elevation of the improved sprocket wheel, partly cut away and one of the clamping units being removed.

Referring now more particularly to the drawings, and to the characters of reference marked thereon, the sprocket wheel comprises a one-piece hub, indicated generally at 1, and which is preferably formed as part of the taper lock hub unit shown in my copending application for patent, Serial No. 145,624, filed October 17, 1961. The hub includes a radially outwardly projecting portion 2 formed, at a relatively short distance radially inward from the outer edge of portion 2, with laterally separated circular seats 3, thus leaving a radially outwardly projecting wall 4 therebetween, as clearly shown in FIG. 2.

The seats 3 are unobstructed at their laterally outer edges, and one or the other of said seats snugly engages the bore 5 of the toothed ring-like unit of the wheel 1, and which is indicated generally at 6. Said unit 6 is preferably stamped from sheet steel or the like, and is actually formed as a pair of identical halves or sections 7 and 8, abutting each other along their radial edges 9, as clearly shown in FIG. 1. Each of the ring sections 7 and 8 is removably secured to the backing wall 4 of the hub 1 by bolts 10.

The ring sections 7 and 8, radially out from the hub wall 4, are pulled together, so that the edges 9 are maintained in positive contact, and the adjacent unbacked areas of such ring sections 7 and 8 are prevented from lateral displacement relative to each other by special locking and alining units now to be described.

These units are indicated generally at 11, and each one is constructed as follows:

As best shown in FIG. 3, such unit comprises a bolt 12 passing through a bore 13 in the sections 7 and 8 and centered at the line of abutment therebetween. The head 15 of the bolt of course overlaps and engages both ring sections 7 and 8 on opposite sides of the edges 9, and on its under or sprocket engaging side said head is formed with a projecting circular flange 16 concentric with and spaced from the bolt 12. The flange is of taper form, especially on its radially inner side, and cooperates with a similarly shaped groove 17 formed in the adjacent faces of the ring sections 7 and 8, and concentric with the bolt bore 13.

A nut 18 on the bolt 12 engages the faces of the ring sections 7 and 8 opposite the groove 17, and when cinched up pulls the flange 16 into tight engagement with the inner wall of the groove 17, and also holds the ring sections 7 and 8 in perfect alinement with each other.

By reason of the above features of construction, it will be seen that upon removing the units 11, and withdrawing the bolts 10, the ring sections 7 and 8 may be instantly disengaged from the hub 1, without any interference from a shaft bearing or other adjacent part of the mechanism of the vehicle. It will be noted that such engagement and removal may be effected either by pulling apart movement of the ring sections 7 and 8, or by movement of the same away from the hub in a direction axially thereof.

Since the ring sections 7 and 8 are made of flat plate, and are identical in appearance except for the groove portions 17, proper location of the sections relative to each other is facilitated, when installing said sections, by means of a circular line or indentation 19 about and of course larger than the groove 17, as shown in FIG. 1.

The sprocket shown in FIGS. 5 and 6 is identical with that above described, except that a pair of sprocket ring units 6 is used—one for each hub seat 3. In this case the alining and locking unit 11a comprises a bolt 12a the same in construction as but longer than the bolt 12, and a spacer 20 about the bolt between the two ring units 6; said spacer on its end opposite the head of the bolt being of taper form, as shown at 21 in FIG. 6, to engage in the taper groove 17 of the adjacent sprocket ring unit 6. The two sprocket ring units 6, at points circumferentially spaced from the clamping units 11a, are permanently clamped together by rivets, one of which is shown at 22 in FIG. 5; each such rivet being surrounded by a spacer 23 extending between said sprocket ring units 6. With this dual sprocket arrangement, the permanently tied together sprocket ring units can of course be disengaged from the hub 1 only by a pulling-apart movement of the dual ring sections 7 and 8 sufficient for them to clear the hub.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sprocket wheel comprising a hub which includes a radially outwardly projecting portion, a circular seat formed on one side of the hub portion concentric with the axis of the hub and radially inward from the periphery of said portion, a toothed ring unit having a central bore engaging said seat and projecting radially out from said hub portion, and means removably connecting said ring unit to the hub portion radially out from the seat; the ring unit comprising a pair of semi-circular sections initially separate from each other and whose radial edges abut each other, and means releasably connecting said sections together adjacent said radial edges radially out from the hub portion, said means holding said sections against separation and relative lateral displacement; the last named means including a bolt projecting through the sections and centered at the radial edges of the sections, a head on the bolt engaging one face of the sections on opposite sides of the line of abutment thereof, a nut on the bolt similarly engaging the opposite face of the sections, and a circular flange projecting from the section-engaging end of the head radially out from and concentric with the bolt, said flange having its radially inner side tapered, and the adjacent face of the sections being formed with a circular groove of a size and shape to receive and cooperate with the tapered flange.

2. A toothed, circular, sprocket wheel plate unit having a central opening, said plate unit being radially split from the opening to the periphery thereof, and means removably connected to and engaging the plate unit on opposite sides thereof and preventing lateral separation of the adjacent parts of the plate unit at said split; said means comprising a bolt projecting through an opening in the plate unit centered at the line of split, the bolt including a head engaging the plate unit on one side thereof and on opposite sides of the split, and a nut on the bolt engaging the plate unit on the other side thereof.

3. A toothed, circular, sprocket wheel plate unit having a central opening, said plate unit comprising separate arcuate sections abutting each other, and means including a detachable unit connecting adjacent sections together on opposite sides of the line of abutment thereof and arranged to prevent separation and lateral displacement of said sections; said means comprising a bolt projecting through an opening in the adjacent sections centered at the line of abutment thereof, the bolt including a head engaging said sections on one side thereof, a nut on the bolt engaging the sections on the opposite side thereof, and a circular flange projecting from the section-engaging face of the head concentric with and larger than the bolt; said sections on the head-engaging side thereof being formed with a circular groove concentric with the bolt opening in which said flange snugly fits.

4. A dual sprocket wheel comprising a pair of separate axially spaced toothed plate units each having a central opening and each comprising a pair of diametrically split sections, the split of the two plate units being alined, a hub on which the units are mounted, and means detachably connecting the sections of the two units to each other against lateral and radial separation at a point radially out from the hub and across the lines of split; said means comprising a bolt projecting through registering openings centered at the lines of split, the bolt including a head engaging the laterally outer face of one unit, a nut on the bolt engaging the laterally outer face of the other unit, a spacer on the bolt between and engaging the units, a circular flange projecting from the unit-engaging face of the head concentric with and larger than the bolt, and a similar flange projecting from the end of the spacer which engages the other unit; said units being each formed with a circular groove concentric with the bolt opening in which the related flange snugly fits.

5. A dual sprocket wheel comprising a pair of separate axially spaced toothed plate units each having a central opening and each comprising a pair of diametrally split sections, the split of the two plate units being alined, a hub on which the units are mounted, and means detachably connecting the sections of the two units to each other against lateral and radial separation at a point radially out from the hub and across the lines of split; a portion of the hub projecting between the units for connection thereto, and means permanently connecting corresponding opposed sections of the two units together radially out from the hub.

References Cited in the file of this patent
UNITED STATES PATENTS

| | | |
|---|---|---|
| 619,514 | Southwick | Feb. 14, 1899 |
| 826,757 | Waterfield | July 24, 1906 |
| 1,540,096 | West | June 2, 1925 |
| 2,525,516 | Bergmann et al. | Oct. 10, 1950 |

FOREIGN PATENTS

| | | |
|---|---|---|
| 394,706 | Great Britain | July 3, 1933 |